United States Patent [19]

Subbarao

[11] Patent Number: 4,965,840
[45] Date of Patent: Oct. 23, 1990

[54] METHOD AND APPARATUS FOR DETERMINING THE DISTANCES BETWEEN SURFACE-PATCHES OF A THREE-DIMENSIONAL SPATIAL SCENE AND A CAMERA SYSTEM

[75] Inventor: Muralidhara Subbarao, Port Jefferson Station, N.Y.

[73] Assignee: State University of New York, Albany, N.Y.

[21] Appl. No.: 126,407

[22] Filed: Nov. 27, 1987

[51] Int. Cl.$^5$ .............................................. G06K 9/00
[52] U.S. Cl. ...................................... 382/1; 354/102; 356/12
[58] Field of Search ......................... 382/1, 41, 49, 65; 358/88, 227; 356/3, 4, 12, 21, 22, 376; 354/402, 406, 408; 350/512, 515

[56] References Cited

U.S. PATENT DOCUMENTS

| | | | |
|---|---|---|---|
| 4,141,032 | 2/1979 | Haeusler | 358/89 |
| 4,404,594 | 9/1983 | Hannan | 358/227 |
| 4,410,804 | 10/1983 | Stauffer | 356/4 |
| 4,573,191 | 2/1986 | Kikode et al. | 356/12 |
| 4,584,704 | 4/1986 | Ferren | 382/65 |
| 4,601,053 | 7/1986 | Grumet | 382/1 |
| 4,634,278 | 1/1987 | Ross et al. | 356/376 |
| 4,636,624 | 1/1987 | Ishida et al. | 354/406 |
| 4,640,620 | 2/1987 | Schmidt | 356/376 |
| 4,661,986 | 4/1987 | Adelson | 382/41 |
| 4,723,139 | 2/1988 | Ogasawara | 354/402 |
| 4,728,980 | 3/1988 | Nakamura et al. | 354/402 |
| 4,792,694 | 12/1988 | Shioya et al. | 356/12 |

OTHER PUBLICATIONS

"A New Sense for Depth of Field", by A. P. Pentland, Jul. 1987 IEEE pp. 523–531.
"A New Sense for Depth of Field", A. P. Pentland, Aug. 1987, vol. PAMI-9, No. 4.
"Depth From Focus", by P. Grossman, Jan. 1987, vol. 5, pp. 63–69.
"Measuring Curved Surfaces for Robot Vision", by Ernest L. Hall, et al., Dec. 1982 IEEE pp. 42–44; 52–53.
"Multiframe Image Point Matching and 3-D Surface Reconstruction", by R. Y. Tsai, Mar., 1983, IEEE, vol. PAMI-5, No. 2.
"A Perspective on Range Finding Techniques For Computer Vision" by R. A. Jarvis Mar., 1983 IEEE vol. PAMI-5, No. 2.

Primary Examiner—David K. Moore
Assistant Examiner—Jose L. Couso
Attorney, Agent, or Firm—Hoffmann & Baron

[57] ABSTRACT

The present invention concerns a method of determining the distance between a surface patch of a 3-D spatial scene and a camera system. The distance of the surface patch is determined on the basis of at least a pair of images, each image formed using a camera system with either a finite or infinitesimal change in the value of at least one camera parameter. A first and second image of the 3-D scene are formed using the camera system which is characterized by a first and second set of camera parameters, and a point spread function, respectively, where the first and second set of camera parameters have at least one dissimilar camera parameter value. A first and second subimage is selected from the first and second images so formed, where the subimages correspond to the surface patch of the 3-D scene, the distance from which to the camera system, is to be determined. On the basis of the first and second subimages, a first constraint is derived between the spread parameters of the point spread function which corresponds to the first and second subimages. On the basis of the values of the camera parameters, a second constraint is derived between the spread parameters of the point spread function which corresponds to the first and second subimages. Using the first and second constrainsts, the spread parameters are then determined. On the basis of at least one of the spread parameters and the first and second sets of camera parameters, the distance between the camera system and the surface patch in the 3-D scene is determined.

26 Claims, 7 Drawing Sheets

METHOD AND APPARATUS FOR DETERMINING THE DISTANCES BETWEEN SURFACE-PATCHES OF A THREE-DIMENSIONAL SPATIAL SCENE AND A CAMERA SYSTEM

BACKGROUND OF THE INVENTION

The present invention relates generally to methods and apparatus for determining the distances between surface patches of three-dimensional spatial scenes (hereinafter "3-D scene") and a camera system. More particularly, however, the present invention relates to methods of and apparatus for determining or finding such distances on the basis of at least a pair of two-dimensional images (hereinafter "images") of the 3-D scene, each of which have been recorded with a camera system having a different set of camera parameter values, and upon which two-dimensional digital processing has been performed in a parallel manner, in order to derive the distances (i.e. ranges) of the surface patches from the camera system.

Determining the distance of objects or visible surface patches in a three-dimensional spatial scene is an important problem in robot and other forms of computer vision processes.

A wide variety of optical range (i.e. distance) finding apparatus and processes are known. Such apparatus and processes may be characterized as cameras which record distance information which is often referred to in the literature as "depth maps" of three-dimensional spatial scenes.

Some conventional two-dimensional range finding cameras record the brightness of objects illuminated by incident or reflected light. Such range finding cameras record images and analyze the brightness of the two-dimensional image to determine its distance from the camera. Such cameras and methods have significant drawbacks as they require controlled lighting conditions and high light intensity discrimination.

There are essentially two-types of optical range finding cameras, referred to as active and passive types, the distinction based upon how the target object or surface patches are illuminated. Active range finding cameras control the source of illumination of the target, whereas passive systems depend upon ambient illumination.

In contrast with passive range finding to be discussed hereinafter, active range finding with light requires a source of illumination controlled by the optical range finding camera. The most intensely researched areas of active range finding are triangulation analysis, time of flight analysis (i.e., LADAR) projection pattern (i.e., Moire) analysis, and focus calibration analysis.

In triangulation analysis, the second camera of a stereo camera system is replaced by a structured light source such as a projector. Typically, the projector originates a pattern of light containing straight edges. If viewed directly on axis with a light projector, the edges would appear as a straight line, regardless of the depth contour of the surface it strikes. Alternatively, if viewed from an offset position, the edges appear bent. The contour of the bend in the edges can be easily correlated to depth.

Another structured light method requires the projection of a pair of regularly spaced two-dimensional patterns on the subject. The two patterns interfere with each other to create a Moire pattern which can be easily photographed. The topographical contours in a Moire pattern are proportional to change in distance of the subject from the camera.

LADAR is similar to electromagnetic ranging by RADAR. The difference is that a pulse modulated laser is used as the active source of illumination. Specially designed sensors in the range finder measure the time of flight of the pulse from the laser to the target and back to the rangefinder. LADAR systems are slow in that they require sequential scanning of the scene to generate a depth-map. Also, they are expensive.

Another system of active light ranging is focus calibration analysis. In such a system, a pencil beam of light is sent out from the camera. The radius of the circle of confusion of the beam, as seen through a calibrated lens, is a measure of the target's distance.

There are three major principles applied in passive range finding: (1) shape analysis; (2) multiple (typically stereo) view analysis; and (3) depth-of-field or optical focus analysis. Embodiments of all three passive range finding principles can be realized with conventional two-dimensional cameras.

For example, one form of shape analysis is realized by observing and recording (e.g., photographing) a target object or surface patch of known size and determining its distance from the camera by simply measuring its recorded size. Alternatively, if two horizontally offset views of an object are photographed, and the two photographs are placed in registration at some point of known depth, the range of any other correlated elements can be measured by measuring their disparity in the horizontal dimension between the registered photographs. This method is also known as stereo vision.

The final passive category is depth-of-field or focus analysis. Optical range finding cameras falling in this category rely on the fact that depth information can be obtained from focal gradients resulting in the limited depth of field which is inherent in most optical systems.

An approach which requires searching for the lens setting that gives the best focused image of the object can be found in automatic focusing methodology. Auto focus methods all measure depth (i.e. distances between the camera and points in the scene) by searching for the lens setting that gives the best focus at a particular point. A survey of such techniques can be found in the paper "A Perspective On Range-Finding Techniques For Computer Vision" by R. A. Jarvis, in IEEE transaction on Pattern Analysis and Machine Intelligence, Volume PAMI-5, pages 122-139, March 1983. The limitations of the basic method are that it measures depth at only one point at a time, and it requires modifying the lens setting over a wide range of values, in order to search for the setting that yields the best focus.

Auto focus methods can, however, be improved by either storing the images acquired at each lens setting, and then searching the stored images for the best focal state at each point, or by employing a large number of specialized focus-measuring devices that conduct a parallel search for the best lens setting. Both alternatives have severe drawbacks in that the first alternative involves acquiring and storing, for example, 30 or more images, while the second alternative requires sophisticated parallel hardware.

Another method based on the depth-of-field analysis, involves measuring the error in focus (i.e. the focal gradient), and employs that measure to estimate the depth. Such a method is disclosed in the paper entitled "A New Sense for Depth Field" by Alex P. Pentland published in the Proceedings of the International Joint Conference on Artificial Intelligence, August, 1985 and revised and republished without substantive change in July 1987 in IEEE Transactions on Pattern Analysis and Machine Intelligence, Volume PAMI-9, No. 4.

Pentland proposed two methods of depth-map recovery. The first method uses a single image of a scene, containing edges which are step discontinuities in the focused image. This method requires the knowledge of the location of these edges and this method cannot be used if there are no perfect step edges in the scene.

In the second method, Pentland discussed a method for measuring the spread parameter of the camera system which involves forming two images through different aperture settings, one of which is required to be that of a pin hole camera. Using the spread parameters computed by this approach, depth estimates of a scene can be calculated using a lens system formula derived using geometrical considerations. Application of Pentland's method poses serious practical difficulties, as it inherently requires forming an image through a pin hole camera (i.e. a very small aperture) which (i) gathers only a very small amount of light, and (ii) increases the corruptive effects of diffraction introduced thereby, which distorts the formed images.

Another method using depth-of-field analysis, is disclosed in the paper entitled "Depth From Focus" by Paul Grossmann in Pattern Recognition letters, Volume 5, pages 63-69, Elsevier Science Publishers, B.V. This method is very similar to Pentland's first method and suffers from the same drawbacks, in that (i) it requires the knowledge of the location of edges, and (ii) it cannot be used unless there are perfect step edges present in the scene.

Optical range finding, as well as "depth-map" recovery can also be passively realized by using stereo vision processes, as disclosed for example in U.S. Pat. No. 4,601,053 to Grumet. Grumet discloses a method for the automatic quantitive ranging on at least a single remote passive object, employing a pair of spaced TV cameras (i.e. binocular vision). Small displacements of corresponding points in a stereo image pair are measured and converted into a range measurement.

However, while methods of depth-map recovery employing stereo vision are known, problems involving shape recovery and image correspondence between different images of a given scene, tend to make such techniques (i) technically difficult to implement (ii) computationally complex, and (iii) error prone because it involves assumptions about the scene geometry.

In view of the prior art discussed hereinabove, it is apparent that there is a great need in the range-finding art, in general, for a generalized method of determining in real-time, either passively or actively, the distance of objects and surface patches of three-dimensional scenes located from a camera system without the accompanying shortcomings and drawbacks of the prior art methods and apparatus.

Accordingly, it is a primary object of the present invention to provide a method and apparatus for determining the distance between a surface patch of a three-dimensional scene and a camera system, on the basis of a pair of two-dimensional images, each of which have been formed using a different set of camera parameter values, and wherein the changes in the values of camera parameters can occur in any of at least one or more of the following camera parameters:

(i) the distance between the second principal plane of the image forming system and the image detector plane of the camera system;
(ii) the diameter of the camera aperture; and
(iii) the focal length of the image forming system.

Another object of the present invention is to provide a method of simultaneously determining the distance of a plurality of surface patches of a three-dimensional scene measured from a camera system (i.e., depth-map recovery), on the basis of a pair of two-dimensional images of the same three-dimensional scene, each of which have been formed through a camera system having a dissimilar set of camera parameter values, and irrespective of whether any part of the image is in focus or not.

A further object of the present invention is to provide such a depth-map recovery process, which is parallel and involve only local computations. With the method of the present invention, there are no restrictions requiring that the camera parameters fall within any particular range, nor are there any assumptions made about the three-dimensional spatial scene being analyzed. The only requirement of the present method is the knowledge of the camera parameters and camera characteristics. The camera characteristic can be acquired initially using a suitable camera calibration procedure which need not be repeated during the process of depth recovery.

An even further object of the present invention is to provide a camera system and a method of rapidly and automatically focusing the camera system by employing the distance measurements determined using the above-mentioned method.

An even further object of the present invention is to provide a method of generating an improved-focus two-dimensional image using the method of depth map recovery of the present invention. This aspect of the present invention can be useful in television broadcasting of scenes containing objects at different distances. It can also be useful in processing images of three-dimensional specimens obtained from television microscopes used in medicine (e.g., opthamalic surgery) and microbiology.

Other and further objects will be explained hereinafter, and will be more particularly delineated in the appended claims, and other objects of the present invention will become apparent hereinafter to those with ordinary skill in the art to which the present invention pertains.

SUMMARY OF THE INVENTION

The present invention is a method of determining the distance between a surface patch of (or an object in) a 3-D scene and a camera system located therefrom. The distance, or range as it is often called, is determined on the basis of at least a pair of images, each image formed using a camera system with either a finite or infinitesimal change in the value of at least one camera parameter (e.g., the distance between the second principal plane and the image detector plane, the focal length of the lens system, or the diameter of the camera aperture).

In particular the method of the present invention provides a computationally efficient process for reliably determining the distance between a surface patch of a 3-D scene and a camera system located therefrom. The camera system of the present invention includes a lens system, and the camera system is characterized by at least three camera parameters, where at least one or more can be set to different values during the image formation process. All of the camera parameters must be quantifiably determinable to provide at least a first and second set of camera parameters, between which there is at least one dissimilar camera parameter value.

The method of the present invention includes forming a first image of the 3-D scene illuminated by electromagnetic wave energy and using the camera system which is characterized by a first set of camera parameters. A second image of the 3-D scene is also formed using electromagnetic-wave energy and the camera system which is characterized by a second set of camera parameters. Notably, the first and second set of camera parameters have at least one dissimilar camera parameter value.

A first and second subimage is selected from the first and second images so formed. The subimages correspond to the surface patch of the 3-D scene, from which the distance to the camera system is to be determined.

On the basis of the first and second subimages, a first "constraint" (i.e., a mathematical representation, a binding relation, or equation) is derived between the spread parameters of the point spread function which corresponds to the first and second subimages. Notably, the point spread function of a camera system describes or defines how points in a 3-D scene map into points in the observed image formed on the image detector plane of the camera system. The spread parameter of the point spread function of a camera system is a measure of image "blur".

On the basis of the values of the camera parameters, a second constraint is derived between the spread parameters of the point spread function which corresponds to the first and second subimages.

Using the first and second constraints mentioned hereinabove, the spread parameters are then determined.

On the basis of at least one of the spread parameters determined hereinabove and the first and second sets of camera parameters, the distance between the camera system and the surface patch in the 3-D scene is determined.

In the preferred embodiment, the first constraint between the spread parameters is derived by computing the first and second power spectral density functions corresponding to the first and second subimages. A ratio expression is then formulated using the first and second power spectral density functions, and on the basis of the ratio expression, the first constraint between the spread parameters is formulated.

The second constraint between the spread parameters is derived by formulating a relationship between the spread parameters and the diameter of the blur circle corresponding to the surface patch in the 3-D scene. Using this relationship, the second constraint between the parameters is derived.

In the preferred embodiment, the camera system includes a camera aperture and an image detector having an image detector plane, and the lens system includes at least one lens-element. The lens system is characterized by first and second principal planes and a focal length, the second principal plane being nearer to the image detector plane. The three camera parameters are (i) the distance between the second principal plane and the image detector plane, (ii) the diameter of the camera aperture, and (iii) the focal length of the lens system. In the preferred embodiment, any one, any two, or all three of these camera parameters can be changed.

In the preferred embodiment, the lens system includes two lenses, but lens systems having one or more than two lenses can also be used as well. The point spread function of the camera system is taken to be of Gaussian form, but the generalized method can use point spread functions of arbitrary form.

Alternatively, the image forming system of the camera can include an optical system having image forming mirrors, lenses, or combinations thereof.

Another aspect of the present invention embraces a method of automatically focusing a camera system using the method described hereinabove, that is, the method for determining the distance between the camera system and a surface patch of a 3-D scene which is to be brought into focus. In this embodiment, the camera parameter that is determined is either the effective focal length of the lens system, or the distance between the second principal plane and the image detector plane which brings the subimage surface patch into focus. This determination is made using a lens system formula which has been derived from geometrical considerations of the camera system. The camera parameter value determined above, is then set to bring the camera system rapidly and automatically into focus.

Another aspect of the present invention concerns a method for determining the distance of a plurality of surface patches of a 3-D scene, as measured from a camera system. Such a method is commonly referred to as recovering the depth map of a 3-D scene. As in the other embodiments of the present invention, the camera system includes a lens system preferably having a multiple lens for simple focal length adjustment. The camera system is characterized by a point spread function and in addition, is characterized by three camera parameters, at least one or more of which can be set to a different value during the image formation process. It is necessary that all of the camera parameter values are quantifiably determinable.

The depth-map recovery method is similar to the method for determining the distances between a surface patch and a camera system located therefrom, except that, instead of determining the distance between the camera system and one surface patch, a plurality of distances from a plurality of surfaces patches in a 3-D scene to the camera system are determined in a parallel manner. The method involves forming first and second images as described hereinabove, and then dividing the first and second images into a plurality of subimages. Each subimage in the first image corresponds to one subimage in the second image. Each subimage of the first and second images corresponds to one of the surface patches of the 3-D scene.

As in the above-described embodiments, the power spectral density function is computed for each subimage of the first and second images. The spread parameter of the point spread function corresponding to each subimage of the first and second images, is determined in a parallel manner, on the basis of the power spectral density function corresponding to each subimage and the first and second sets of camera parameters. Thereafter, in a parallel manner, the distances between the camera system and each surface patch in the 3-D scene are determined, as in the above-described methods, on the basis of one of the spread parameters corresponding to the subimages previously determined, and the two sets of camera parameters. By this method of two-dimensional image processing, depth-map recovery of the 3-D scene is provided in real-time and in a computationally efficient manner.

As with the aforementioned embodiments, any one or more of the camera parameters in this method can be set to different values during the image formation process.

Yet another aspect of the present invention embraces a method of generating an improved-focus image from a pair of first and second images formed in accordance with the principles of the present invention. The method of generating improved-focus images uses the plurality of spread parameters determined in the method of recovering a depth-map of a 3-D scene, as discussed hereinabove. Specifically, this method uses the computed spread parameters corresponding to respective subimages, to perform two-dimensional digital signal processing on the same, in order to improve the focus of each subimage, the sum total of which when synthesized, produces the improved image.

The method of generating improved-focus images comprises determining the transfer function of the camera system corresponding to each subimage. This determination is made on the basis of the "optical transfer function" (i.e., the Fourier transform of the point spread function) of the camera system, at least one of the spread parameters which correspond to each subimage, and the first and second images. The two-dimensional Fourier transform of each subimage is then computed. The two-dimensional Fourier transform for each improved-focus subimage is computed on the basis of the transfer function of the camera system for each subimage, and the corresponding two-dimensional Fourier transform of each acquired (i.e., observed) subimage. The inverse Fourier transform is computed for each two-dimensional Fourier transform determined in the above step to provide the improved-focus subimage corresponding thereto. Thereafter, the improved-focus subimages are synthesized to form the improved-focus image.

The camera system used in the above described embodiment can be the same camera system as used in the method of depth-map recovery.

Also provided is apparatus for determining the distances between surface patches of a 3-D scene and the camera system described hereinbefore, but notably however, it can be used to practice the other embodiments hereof. In general, the apparatus includes the camera system described hereinabove, and means for varying the value of at least one or more of the camera parameters. The apparatus also includes means for quantitatively measuring the magnitude of the value of each of the camera parameters including the changes in the camera parameter values effected by the means for varying the same. In addition, the apparatus includes means for acquiring two-dimensional images from the image detector and generating digital image data corresponding to each acquired image. To determine the distance between the surface patch and the camera system, an image processing computer is provided for receiving the digital image data of the acquired images and processing the same. Additionally, the apparatus can include a means for visually displaying (i) the values of the camera parameters, (ii) the changes effected therein during the image acquisition process, and (iii) a three-dimensional graphical model of depth-maps recovered.

As a result of the present invention, the depth-map of an entire 3-D scene can be obtained at once, irrespective of whether any part of the image is in focus or not, and regardless of the values of the camera parameters.

In the preferred embodiment of the present invention, the spread parameter corresponding to each subimage can be easily determined and most significantly, irrespective of the diameter settings of the camera aperture during the formation (i.e., acquisition) of the first and second images. This result is in contrast with the prior art which requires that one of the diameter settings of the camera aperture be nearly zero.

The method for generating improved-focus two-dimensional images is particularly suitable for use in microscopy for deriving an improved-focus two-dimensional image of a 3-D microscope specimen. This method also has an important use in deriving a television image display of a 3-D scene in which both the foreground objects and background objects in the scene appear in focus in the television image display, despite significant differences in the respective positions of the foreground and background objects in the depth dimension of the 3-D scene.

Another advantage of the present invention is that it provides a passive method of rapidly auto-focusing a camera system. In particular, this method requires acquiring and processing only two images, whereas in contrast, prior art requires acquiring and processing a sequence of images formed by either moving the image detector plane back and forth along optical axis or by varying the focal length of the lens system over a range of focal length values.

BRIEF DESCRIPTION OF THE DRAWINGS

For a further understanding of the objects of the present invention, reference is made to the following description of the preferred embodiment which is to be taken in connection with the accompanying drawings, wherein.

DETAILED DESCRIPTION OF THE PREFERRED EMBODIMENTS

Figure 1:
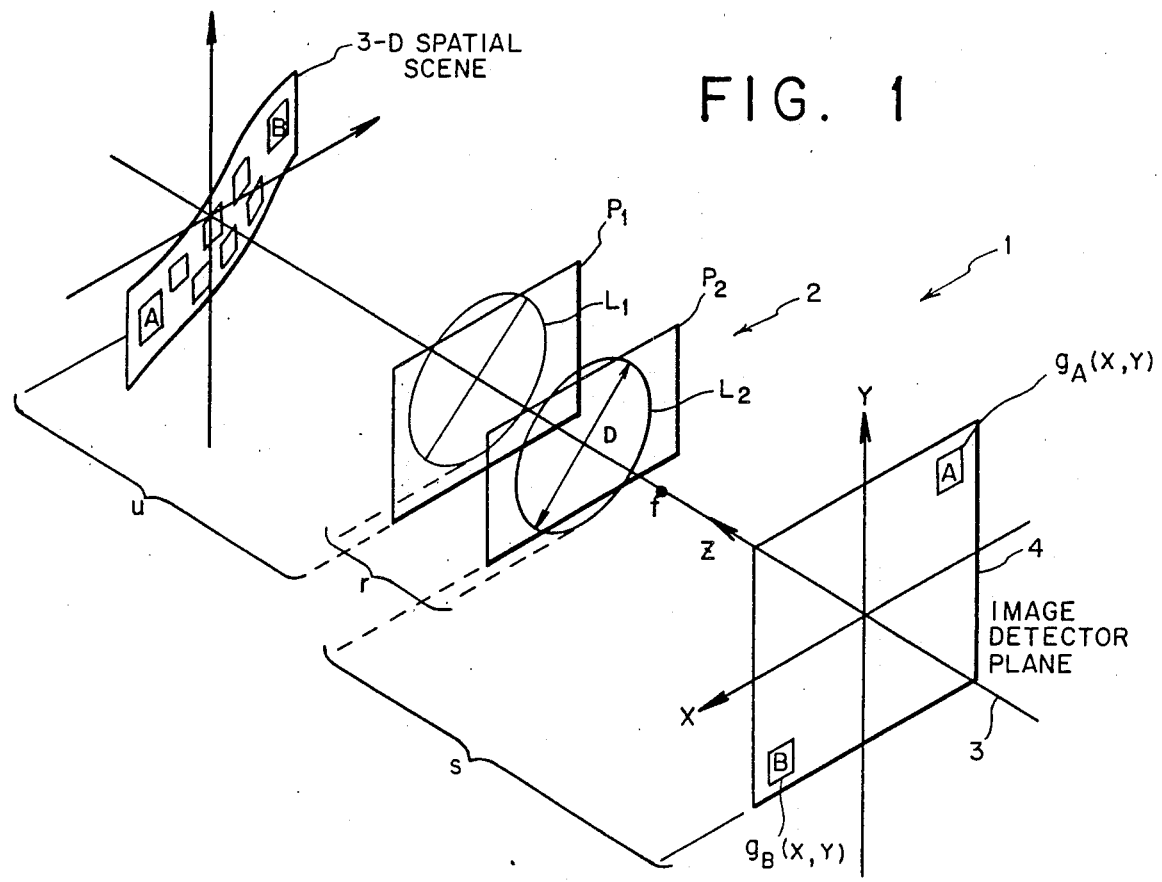
FIG. 1 is a perspective schematic diagram showing a scene and containing two surface patches and a camera system including a lens system and an image detector located along the optical axis thereof, illustrating the camera system geometry and camera parameters.

Referring to FIG. 1, a perspective schematic diagram of the camera system of the present invention is shown viewing a three-dimensional spatial scene. The camera system 1 in the preferred embodiment includes a lens system 2 having a first lens $L_1$ and a second lens $L_2$ disposed along an optical axis 3 to allow for the adjustment of the focal length f of the lens system 2. The focal length f is a camera parameter.

The lens system can be characterized by a first principal plane $P_1$ and a second principal plane $P_2$, and each lens $L_1$ and $L_2$ as having a lens plane in the conventional sense. The value of the focal length f of the lens system is changed by translating the lens $L_2$ back and forth along the optical axis. The other lens $L_1$ viewing the scene directly, is not moved. Both lenses can be convex lenses or one of them can be concave. In either case, the effective focal length f is determined from the well known formula $$\frac{1}{f} = \frac{1}{f_{L1}} + \frac{1}{f_{L2}} - \frac{r}{f_{L1} f_{L2}} \qquad (1)$$

where $f_{L1}$ and $f_{L2}$ are the focal lengths of the two lenses $L_1$ and $L_2$, respectively, and r is the distance between the two lenses. The positions of the principal planes $P_1$, $P_2$ and principal point $Q_1$, $Q_2$ of the lens system are determined using well known methods in geometric optics, for example, as discussed in Chapter VII, Section 2 of the text Optics (1968), by K. N. Ogle published by Charles C. Thomas, Springfield, Ill. As an alternative method of changing f by translating lens $L_2$, it is also possible to have a lens system comprising more than two lenses where the focal length f is changed by substituting one lens by another having a different focal length.

The camera system also includes an image detector plane 4 on which a projected image is formed and recorded. The distance between the second principal plane $P_2$ of the lens system and the image detector plane 4, is designated as s and constitutes a camera parameter. The value of the camera parameter s can be changed by translating the image detector plane 4 back and forth along the optical axis.

The third camera parameter of the camera system is the diameter D of the camera aperture, the value of which is independently controlled by changing the diameter thereof. It is desirable to have as large a camera aperture as possible, as a larger camera aperture (i) yields a smaller depth of field and thus a greater range (or depth) discrimination capability to the camera system, (ii) provides greater image irradiance, and (iii) reduces corruptive effects due to diffraction.

Figure 2:
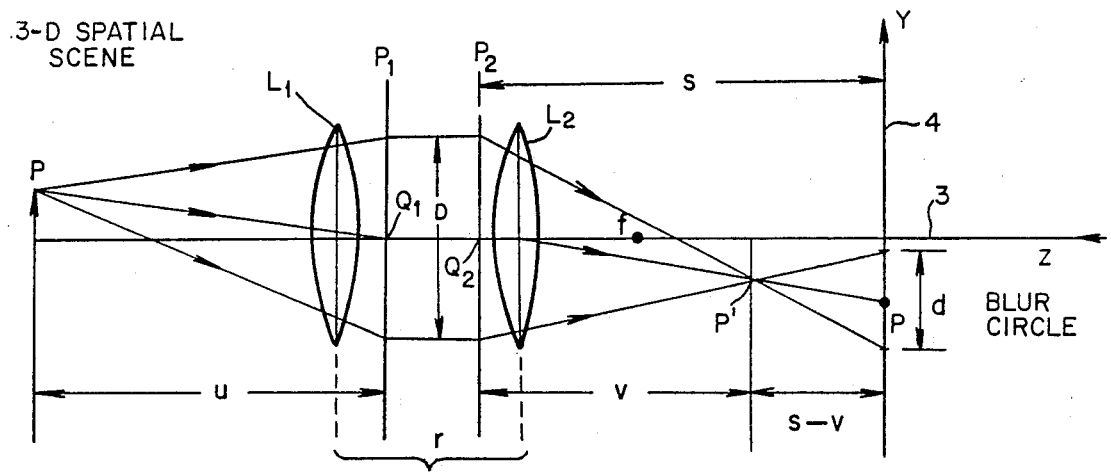
FIG. 2 is a side view of the schematic diagram of FIG. 1, illustrating the geometry and camera parameters of the camera system used in the preferred embodiment of the present invention

The theoretical foundations underlying the methods of the present invention are explained by referring to FIGS. 1 and 2, in particular.

In FIG. 2, a point P on the surface patch in the three-dimensional spatial scene, is focused at p' and projected as an image p on the image detector plane 4. The relation between the positions of p' and P is given by the lens system formula $$\frac{1}{f} = \frac{1}{u} + \frac{1}{v} \qquad (2)$$

where f is the effective focal length, u is the distance of the object P to the first principal plane $P_1$, and v is the distance between the focused image p' and the second principal plane $P_2$.

If image p is not in focus then the lens system produces on the image detector plane 4, a circular image commonly called a "blur circle." From simple plane geometry and the above-stated lens formula (2), it can be shown that the diameter of the blur circle is given by $$Ds\left[\frac{1}{f} - \frac{1}{u} - \frac{1}{s}\right] \qquad (3)$$

where D is the effective diameter of the lens system. Normalizing the spatial magnification of the blur circle by dividing its diameter by camera parameter s, the normalized diameter d is obtained as $$d = D\left[\frac{1}{f} - \frac{1}{u} - \frac{1}{s}\right] \qquad (4)$$

In the above equation, the normalized diameter d can be either positive or negative depending on whether $s \geq v$ or $s < v$. In the former case, the image detector plane is behind the focused image p' and in the latter case it is in front of the focused image p'. According to principles of geometric optics, the image intensity within the blur circle is, in theory, constant and given by $$h_c(x,y) = \frac{4}{\pi d^2}, \text{ if } x^2 + y^2 \leq d^2/4, \text{ and} \qquad (5)$$

$$0, \text{ if } x^2 + y^2 > d^2/4.$$

However, due to system-band width limitations caused by diffraction and lens aberrations, a more appropriate model of the intensity distribution (i.e., the point spread function), is given by a two-dimensional Gaussian function $$h(x,y) = \frac{1}{2\pi\sigma^2} \text{EXP}\left[\frac{-1}{2} \frac{x^2 + y^2}{\sigma^2}\right] \qquad (6)$$

where EXP represents the exponential function, and $\sigma$ is the spread parameter of the point spread function, such that $$\sigma = kd \text{ for } k \geq 0. \qquad (7)$$

Notably, k is a constant of proportionability which is characteristic of a given camera, and is determined initially by camera calibration known in the art.

By definition, the blurred image of point P, represented by h(x,y), is actually the point spread function of the camera system. From the above equations, the following formula for the spread parameter can be derived:

$$\sigma = kD\left[\frac{1}{f} - \frac{1}{u} - \frac{1}{s}\right] \qquad (8)$$

It is particularly noted that the point spread function h(x,y) above is defined in terms of the spread parameter $\sigma$, and therefore is different for points at different distances from the lens plane. The volume of h(x,y) can be shown to be unity, and the Fourier transform of h(x,y) commonly called the optical transfer function of the camera system is of the form:

$$H(w,v) = EXP[-\tfrac{1}{2}(w^2+v^2)\sigma^2] \qquad (9)$$

where w,v are spatial frequency parameters expressed in radians per unit distance.

Having described the mathematical form of the point spread function of the camera system, it is now appropriate to describe the mathematical form of the observed image g(x,y) of a three-dimensional scene on the image detector plane expressed in terms of the point spread function of the camera system h(x,y) and the spatial intensity distribution f(x,y) of the focused image of the surface patch.

G(w,v) and F(w,v) are the two-dimensional Fourier transforms of g(x,y) and f(x,y) respectively, and by well established principles, the observed image g(x,y) can be expressed as $$g(x,y) = h(x,y)*f(x,y) \qquad (10)$$

where * denotes the convolution operation. Recalling that convolution in the spatial domain is equivalent to multiplication in the Fourier domain, the above equation can be expressed in the Fourier domain as $$G(w,v) = H(w,v)\,F(w,v) \qquad (11)$$

By established principles, the power spectral density function P(w,v) of G(w,v) is given by $$P(w,v) = G(w,v)\,G^*(w,v) \qquad (12)$$

where $G^*(w,v)$ is the complex conjugate of G(w,v). Noting that $G^*(w,v) = H^*(w,v)\,F^*(w,v)$, the above expression can be written as $$P(w,v) = H(w,v)H^*(w,v)\,F(w,v)F^*(w,v) \qquad (13)$$

Substituting for H(w,v) from equation (9), the power spectral density function P(w,v) of a blurred image region is expressed as $$P(w,v) = EXP[-(w^2+v^2)\sigma^2]\,F(w,v)F^*(w,v) \qquad (14)$$

Since the power spectral density function P(w,v) expressed above is a function of the spread parameter $\sigma$, and since the spread parameter $\sigma$ has been shown to be different for objects in the scene at different distances from the camera, preferably the analysis of the formed two-dimensional images is performed on subimage regions in which the spread parameter $\sigma$ is approximately constant.

In addition, due to blurring, the intensity of a subimage at its border pixels is affected by the intensity of adjacent subimages. This phenomenon is known as image overlap, which occurs when the image intensity distribution produced by adjacent visible surface patches in the scene overlap in the observed image. In order to reduce the adverse effects of image overlap, each subimage intensity distribution is weighted (i.e. multiplied) by an appropriate two-dimensional Gaussian function centered at the subimage of interest. The resulting weighted subimages are then used in the method of the present invention, the mathematical foundations of which are given hereinbelow for the following various embodiments of the present invention.

In the first embodiment of the present invention, the range of the desired surface patch from a camera system is determined using a pair of two-dimensional images $g_1(x,y)$ and $g_2(x,y)$ of the desired surface patch. These images $g_1(x,y)$ and $g_2(x,y)$ are formed by a camera system having camera parameters $\{s_1, f_1, D_1\}$ and $\{s_2, f_2, D_2\}$, respectively. These sets of camera parameters have at least one dissimilar parameter with a finite value difference. From equations (9) and (11), the Fourier transforms of $g_1(x,y)$ and $g_2(x,y)$ are $$G_1(w,v) = EXP[-\tfrac{1}{2}(w^2+v^2)\sigma_1^2]\,F_1(w,v) \qquad (15A)$$

$$G_2(w,v) = EXP[-\tfrac{1}{2}(w^2+v^2)\sigma_2^2]\,F_2(w,v) \qquad (15B)$$

Using equation (14), the power spectral density functions for images $g_1(x,y)$ and $g_2(x,y)$ formed with dissimilar camera parameter values $\{s_1, f_1, D_1\}$ and $\{s_2, f_2, D_2\}$ are expressed as $$P_1(w,v) = EXP[-(w^2+v^2)\sigma_1^2]\,F(w,v)\,F^*(w,v) \qquad (16A)$$

and $$P_2(w,v) = EXP[-(w^2+v^2)\sigma_2^2]\,F(w,v)\,F^*(w,v), \qquad (16B)$$

respectively. By dividing equation (16A) by equation (16B), the following expression is obtained $$\frac{P_1(w,v)}{P_2(w,v)} = EXP[-(w^2+v^2)(\sigma_1^2 - \sigma_2^2)] \qquad (17)$$

Now, by taking the logarithm of both sides of the above equation, and rearranging terms, the following expression is obtained $$\sigma_1^2 - \sigma_2^2 = \frac{-1}{w^2+v^2} L_N\left[\frac{P_1(w,v)}{P_2(w,v)}\right] \qquad (18)$$

For some spatial frequency pair (w,v), the right hand side of the above equation (18) can be computed from the given image pair $G_1(w,v)$ and $G_2(w,v)$. Therefore, equation (18) can be used to determine $\sigma_1^2 - \sigma_2^2$ from the observed images $g_1(x,y)$ and $g_2(x,y)$. In principle, measuring the power spectral density at a single spatial frequency point (w,v) is sufficient to determine the value of $\sigma_1^2 - \sigma_2^2$, but a more robust estimate can be obtained by taking the average over some region in the spatial frequency domain.

The estimated average of expression (18) above can be represented by C where $$C = \frac{1}{A} \sum_R \sum \frac{1}{w^2 + v^2} \ln\left[\frac{P_1(w,v)}{P_2(w,v)}\right] \qquad (19)$$

and R is a region on the spatial frequency domain not containing points where $P_1(w,v) = P_2(w,v)$, and A is the area of region R. Therefore, from the observed images $g_1(x,y)$ and $g_2(x,y)$, the constraint between spread parameters $\sigma_1$ and $\sigma_2$ can be obtained from equation (18):

$$\sigma_1^2 - \sigma_2^2 = C \qquad (20)$$

Above, there is one equation with two unknowns. To solve for spread parameters $\sigma_1$ and $\sigma_2$, an additional equation is obtained from the two dissimilar sets of camera parameters $\{s_1, f_1, D_1\}$ and $\{s_2, f_2, D_2\}$ as follows. From equation (8) derived hereinbefore and the two camera parameter sets corresponding to the observed images $g_1(x,y)$ and $g_2(x,y)$ respectively, the following two equations are obtained:

$$\sigma_1 = k_1 D_1 \left[\frac{1}{f_1} - \frac{1}{u} - \frac{1}{s_1}\right], \qquad (21A)$$

and $$\sigma_2 = k_2 D_2 \left[\frac{1}{f_2} - \frac{1}{u} - \frac{1}{s_2}\right]. \qquad (21B)$$

Eliminating from the above two equations, u the distance from the camera to the surface patch, the following equation is obtained $$\sigma_1 = \alpha \sigma_2 + \beta \qquad (22)$$

where $$\alpha = \frac{k_1 D_1}{k_2 D_2} \qquad (23A)$$

and $$\beta = k_1 D_1 \left[\frac{1}{f_1} - \frac{1}{f_2} + \frac{1}{s_2} - \frac{1}{s_1}\right] \qquad (23B)$$

The Equations $\sigma_1^2 - \sigma_2^2 = C$ and $\sigma_1 = \alpha \sigma_2 + \beta$ together constitute two equations expressed in terms of two unknown variables.

It is important to emphasize that these two equations are fundamental to the present invention. The first of these, i.e. $\sigma_1^2 - \sigma_2^2 = C$, represents a first "constraint" (that is a binding relation or mathematical expression) between the two spread parameters obtained from the observed images. The second equation, i.e. $\sigma_1 = \alpha \sigma + \beta$, represents a second "constraint" (i.e. a binding relation or mathematical expression) obtained solely from camera parameter values and camera characteristics. It has been discovered that there are other approaches to determine the spread parameter values $\sigma_1$ and $\sigma_2$. However, regardless of the approach adopted, the method of the present invention involves deriving two constraints where (i) one of the constraints is obtained from the observed images and (ii) the other constraint is obtained from camera parameter values and camera characteristics. The two equations thus derived are solved simultaneously to obtain the spread parameters $\sigma_1$ and $\sigma_2$. Significantly, the expression defining the constraints between the spread parameters $\sigma_1$ and $\sigma_2$ in terms of the camera parameters and camera characteristics, can be obtained independent of the domain of analysis of the observed images. Examples of such domains include Fourier, spatial, Z-transform, etc.

From the fundamental equations (20) and (22), the following equation for the preferred embodiment is derived $$(\alpha^2 - 1)\sigma_2^2 + 2\alpha\beta\sigma_2 + \beta^2 = C \qquad (24)$$

The above expression is a quadratic equation (i.e., polynomial function) expressed in terms of the spread parameter $\sigma_2$, the solution to which is given by $$\sigma_2 = \frac{-\alpha\beta \pm [\beta^2 + C(\alpha^2 - 1)]^{-\frac{1}{2}}}{(\alpha^2 - 1)} \qquad (25)$$

In general, there Will be two solutions to this equation. However, a unique solution is obtained if both observed images $g_1(x,y)$ and $g_2(x,y)$ are formed through the same camera aperture diameter setting, i.e., $D_1 = D_2$. Other special cases can be derived where a unique solution is obtained, for example when the two camera aperture diameters are dissimilar (i.e. $D_1 \neq D_2$) and focal length and image detector-to-second principal plane distances are similar (i.e., $f_1 = f_2 = s_1 = s_2$). In this case, only the negative solutions of the spread parameters $\sigma_1$ and $\sigma_2$ are acceptable.

Having solved for the spread parameters $\sigma_1$ and $\sigma_2$, and ascertained camera parameter sets $\{s_1, f_1, D_1\}$ and $\{s_2, f_2, D_2\}$, the distance or range u of a surface patch to the camera system can be computed from equations (21A) or (21B) as:

$$u = \frac{k_1 D_1 s_1 f_1}{s_1 f_1 \sigma_1 + k_1 D_1 (f_1 - s_1)} \qquad (26A)$$

or $$u = \frac{k_2 D_2 s_2 f_2}{s_2 f_2 \sigma_2 + k_2 D_2 (f_2 - s_2)}, \qquad (26B)$$

respectively.

In another embodiment of the present invention, the range of the desired surface patch from a camera system is determined using a pair of two-dimensional images $g_1(x,y)$ and $g_2(x,y)$ of the desired surface patch, which have been formed by a camera system having camera parameters $\{s, f, D\}$ and $\{s + \delta s, f + \delta f, D + \delta D\}$ where $\delta s$, $\delta f$, $\delta D$ are infinitesimally small changes in the respective camera parameter values. At least one of $\delta s$, $\delta f$, $\delta D$ should be non-zero.

From equation (8), the following expression is obtained $$\delta\sigma = \frac{d\sigma}{ds}\delta s + \frac{d\sigma}{df}\delta f + \frac{d\sigma}{dD}\delta D \qquad (27A)$$

$$\delta\sigma = \frac{kD}{s^2}\delta s - \frac{kD}{f^2}\delta f + \frac{\sigma}{D}\delta D \qquad (27B)$$

From the earlier derived expression (14), the following expression can be derived $$\delta P(w,v) = -2(w^2 + v^2)P(w,v)\sigma\delta\sigma \qquad (28)$$

Rearranging terms in the above expression, the following expression is obtained $$\sigma \delta \sigma = -\tfrac{1}{2} \frac{1}{w^2 + v^2} \frac{\delta P(w,v)}{P(w,v)} \qquad (29)$$

the right side of which is defined as C below:

$$C = -\tfrac{1}{2} \frac{1}{w^2 + v^2} \frac{\delta P(w,v)}{P(w,v)} \qquad (30)$$

In principle, measuring P(w,v) and δP(w,v) at a single point (w,v) in spatial frequency domain is sufficient to compute C, but as indicated hereinbefore, a more robust estimate of C can be computed form the observed images as $$C = -\frac{1}{2A} \sum_R \sum \frac{1}{w^2 + v^2} \frac{\delta P(w,v)}{P(w,v)} \qquad (31)$$

where, as hereinbefore, R is a region in the spatial frequency domain which does not contain points where δP(w,v)=0, and where A is the area of region R. From the expressions (27B), (29), and (31), the following expression is obtained $$C = \sigma \left[ \frac{kD\delta s}{s^2} - \frac{kD\delta f}{f^2} + \frac{\sigma}{D} \delta D \right] \qquad (32)$$

which is a quadratic equation (i.e. second order polynomial function) in terms of the spread parameter $\sigma$.

By solving the above quadratic equation (32), the spread parameter $\sigma$ can be determined using methods known in the art. In general, two solutions are obtained, however, a unique solution is obtained for $\sigma$ if the camera aperture diameter D is not changed during the image formation process, i.e., δD=0. From spread parameter $\sigma$, the distance u can be obtained from $$u = \frac{kDsf}{sf\sigma + kD(f - s)} \qquad (33)$$

Having explained the theoretical foundations of the principal embodiment of the method of the present invention, a description is now given of the method of determining the distance between a surface patch and the camera system.

Figure 3:
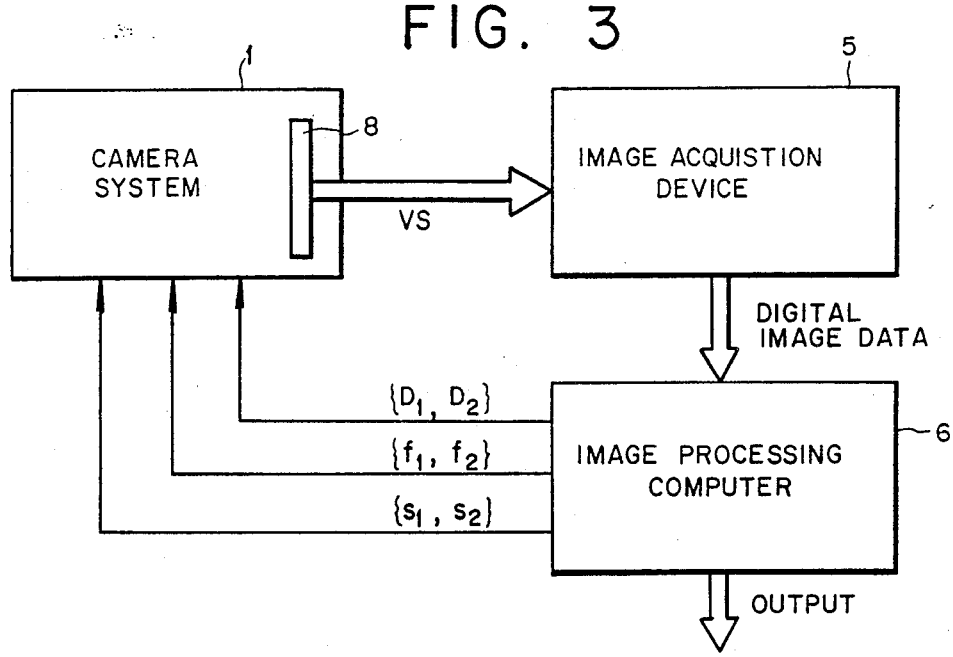
FIG. 3 is a block diagram of the apparatus of the present invention showing a camera system, digital image acquisition device, and an image processing computer.
Figure 4:
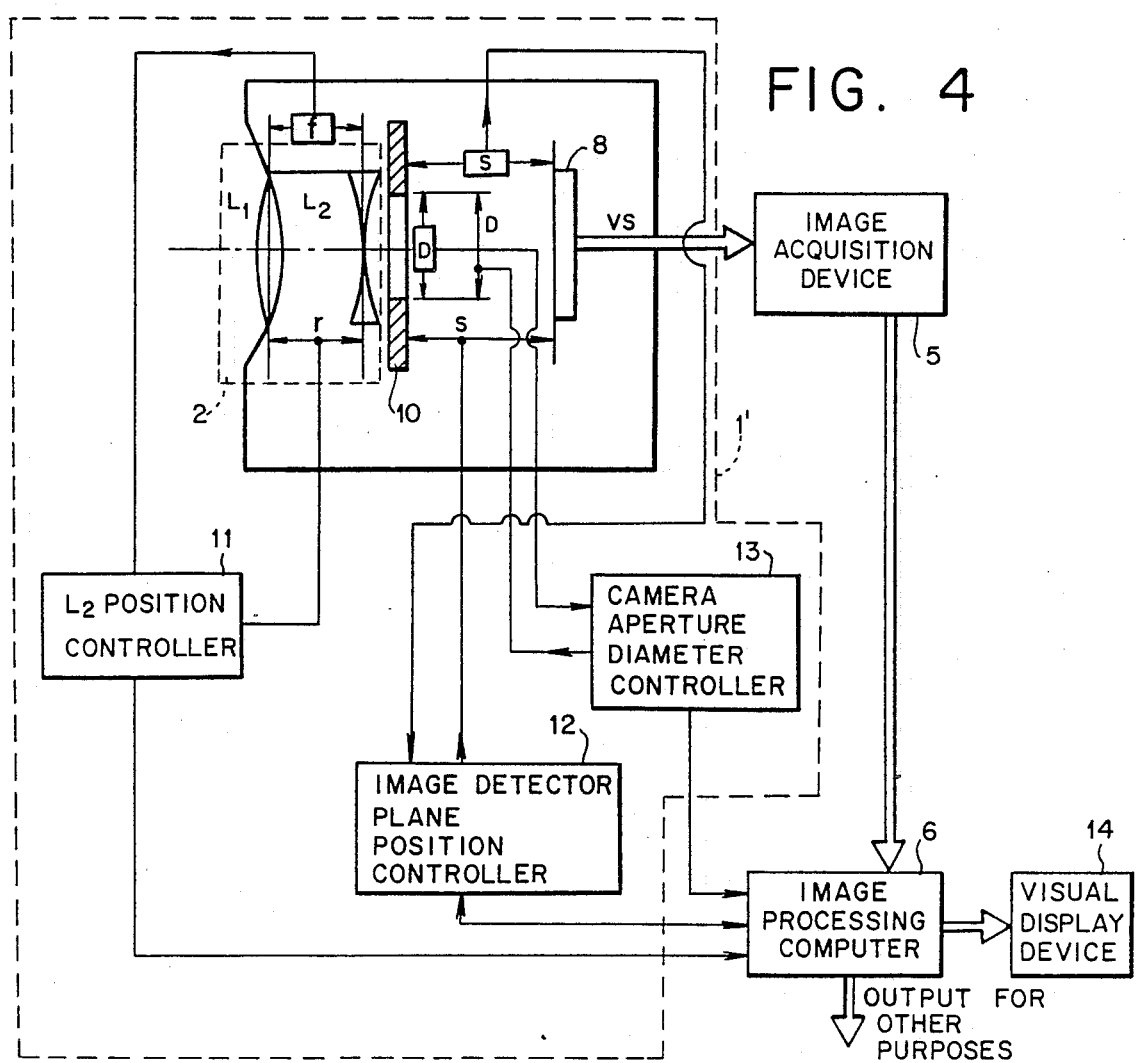
FIG. 4 is a block diagram of a computer-controlled camera system for the apparatus of FIG. 3, illustrating a lens position controller for varying the focal length of the lens system, image detector plane position controller for varying the distance between the image detector plane and the second principal plane of the lens system, and a camera aperture diameter controller for varying the diameter of the camera aperture.
Figure 5:
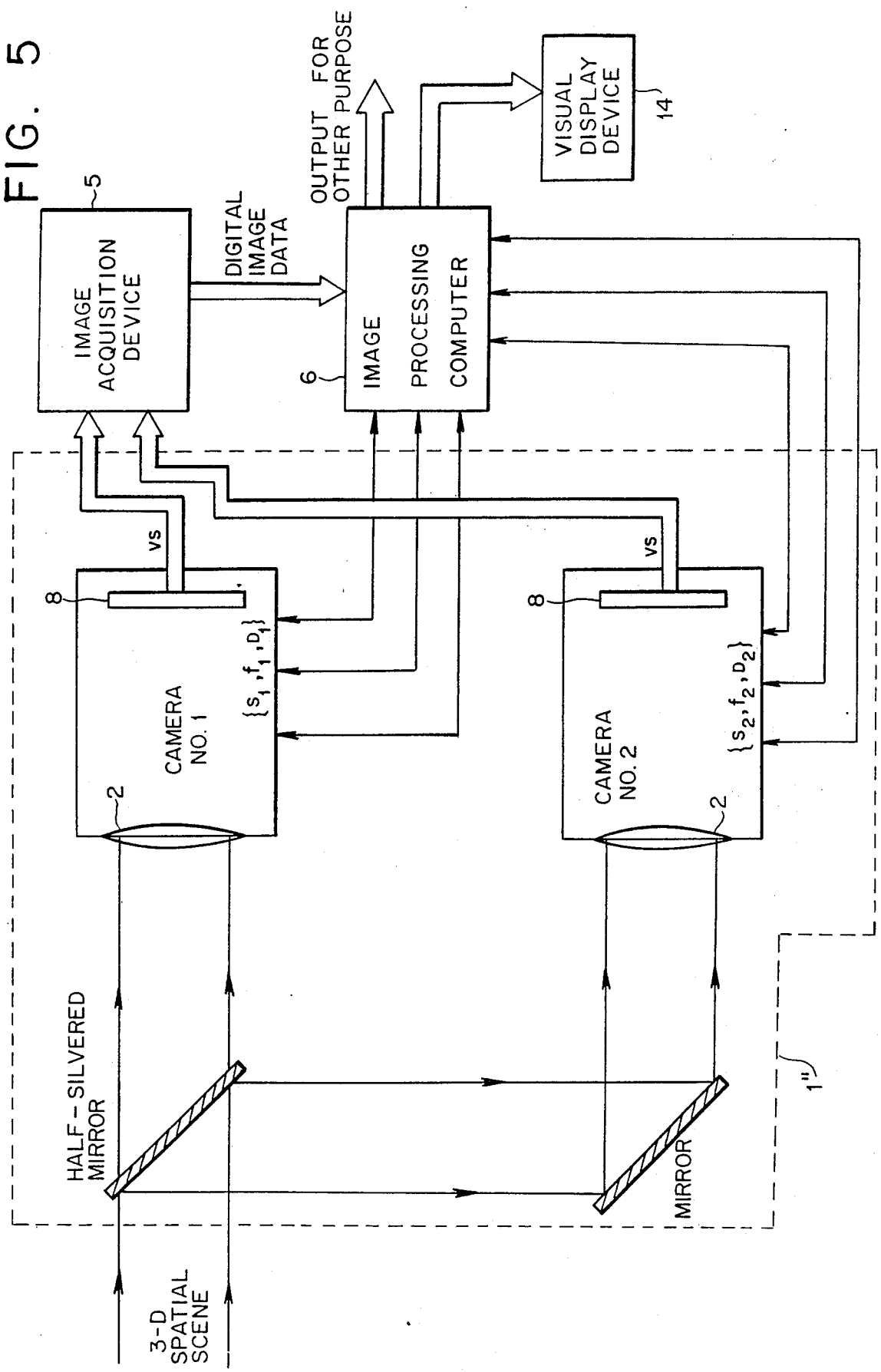
FIG. 5 is a block diagram of an alternative camera system for the apparatus of FIG. 3, having a two camera configuration for simultaneously forming a pair of two-dimensional images of a 3-D scene from the same viewing point, with each camera system using a set of camera parameters having at least one dissimilar value.

In carrying out the method of the present invention, there are various types of apparatus which can be used, examples of which are illustrated in FIGS. 3, 4 and 5. As illustrated in FIG. 5, the camera system used in the image formation process can be two separate cameras, each characterized by a different set of camera parameters and viewing the surface patch from the same viewpoint. Alternatively, as illustrated in FIG. 4, a single computer-controlled camera system with variable camera parameters can be used as well. In both cases, however, the camera system will have the general configuration as illustrated by the block diagram of FIG. 3.

Figure 8:
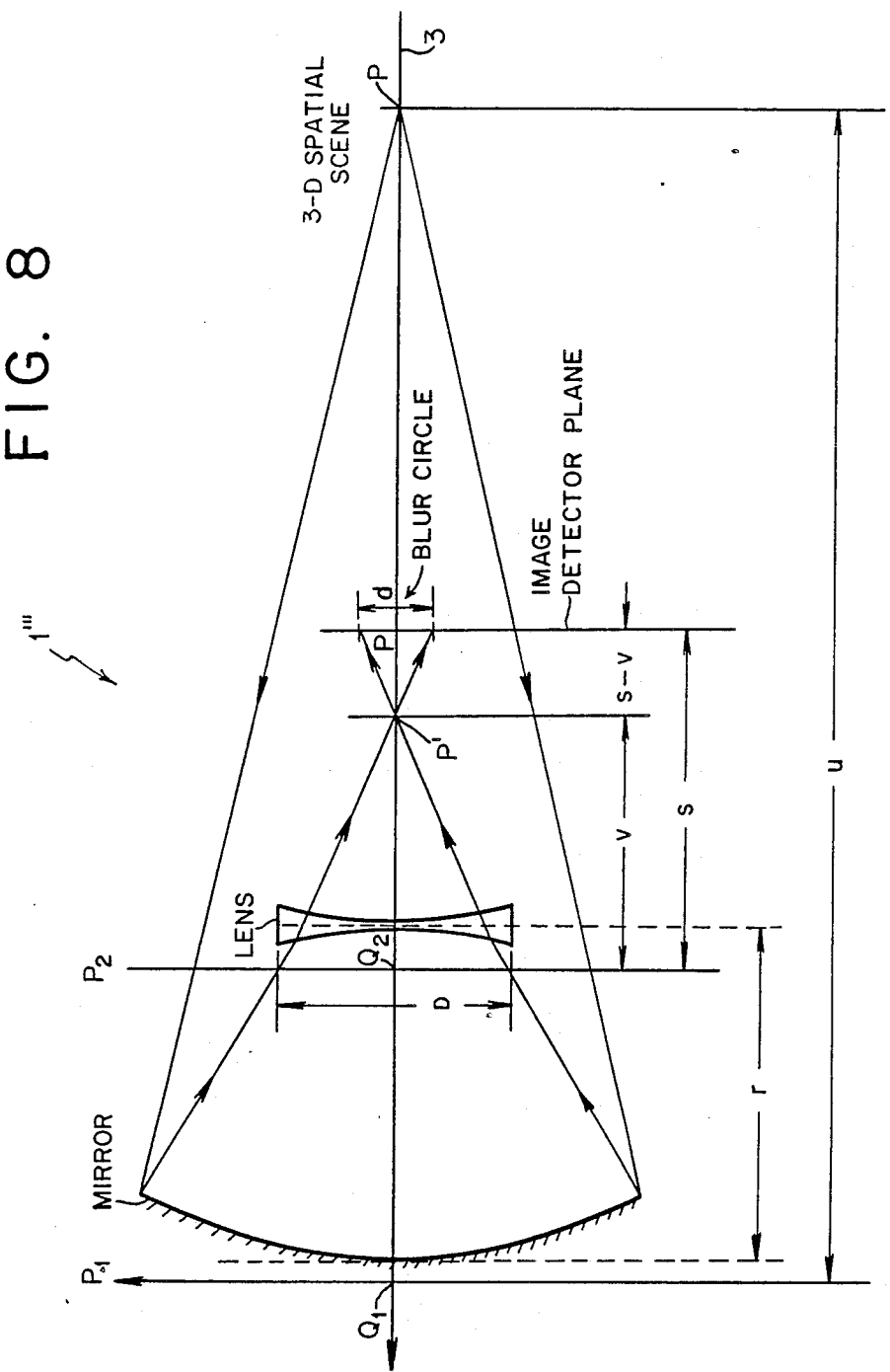
FIG. 8 is a schematic diagram of the camera system of the present invention illustrating a plan view of an alternative image forming system thereof, employing an image forming mirror.

In FIG. 3 apparatus of the preferred embodiment is illustrated as including a camera system 1, a image acquisition device 5, and an image processing computer 6. The camera system 1 includes an image forming system, which in the preferred embodiment is a lens system characterized by at least three camera parameters {s, f, D}. Alternatively, it may be desired in some applications to use an image forming system which includes an image forming mirror or mirrors in order to form an image. Such an alternative system is illustrated in FIG. 8, which shows a camera system 1''' including an image forming system having a lens and a mirror.

In the preferred embodiment, a digital image detector 8 such as a charge coupled device (CCD) array forms the image detector plane of the camera system. The image detector can be photographic film as well, in which case, subsequent digitization is required. Preferably, a conventional digital image acquisition device 5 is used to obtain from the video signal (vs) produced by the camera system 1, a digital image intensity matrix g(x,y), where 1<×<m, and 1<y<n, with integers m and n specifying the size of the image. As illustrated in FIG. 3, the image processing computer 6 in response to input control data specifying values of camera parameters, issues control signals to the camera system to set the respective camera parameter values.

After image acquisition, the image processing computer processes the digitized image intensity matrix g(x,y) according to the image processing methods of the present invention.

FIG. 4 illustrates one possible camera configuration which can be used in practicing the method of the present invention. Therein, a computer-controlled camera system with variable camera parameters is illustrated. The computer controlled camera system includes a camera system 1', a digital acquisition device 5 and an image processing computer 6. The camera includes a lens system 2, a camera stop 10 providing a camera aperture, and an image detector 8. In this embodiment, the lens-system comprises two lenses $L_1$ and $L_2$ separated by a distance r which is variable. The camera system 1' also includes a lens $L_2$ position controller 11, an image detector plane position controller 12, and a camera aperture diameter controller 13, each of which receive control signals from the image processing computer 6, and adjust and/or measure its respective camera parameter. Measurement of the camera parameters s, f, and D are made by sensors labeled as "s", "f", and "D", respectively. These sensors can be of the direct contact or non-contact type known in the art. The $L_2$ position controller 11 controls the effective focal length f of the camera system 1' by varying the distance r between lens $L_1$ and $L_2$. The image detector plane position controller 12 controls the camera parameter s directly. The camera aperture controller 13 controls the diameter D of the camera aperture. The principal advantage of the camera configuration of FIG. 4 is that only one camera unit is required having computer-controllable parameters.

An alternate embodiment of the camera system of FIG. 3 is illustrated in FIG. 5. Shown therein is a camera system 1'' having a two camera configuration for simultaneously forming a pair of images of a 3-D scene from the same viewpoint by using a mirror configuration. In this embodiment, the set of camera parameters {s, f, D} are different for each camera unit, and preferably are preset prior to image formation and need not be changed during the image formation process as required in the camera configuration of FIG. 4.

In the camera configurations of FIGS. 4 and 5, a visual display device 14 is provided for visually displaying the distances determined using the method of the present invention. Preferably, the visual display device 14 is a cathode ray tube device which is suitable for graphically displaying 3-D perspective views of determined depth-maps of a 3-D scene, as well as displaying numerical values of camera parameters and the like.

Figure 6:
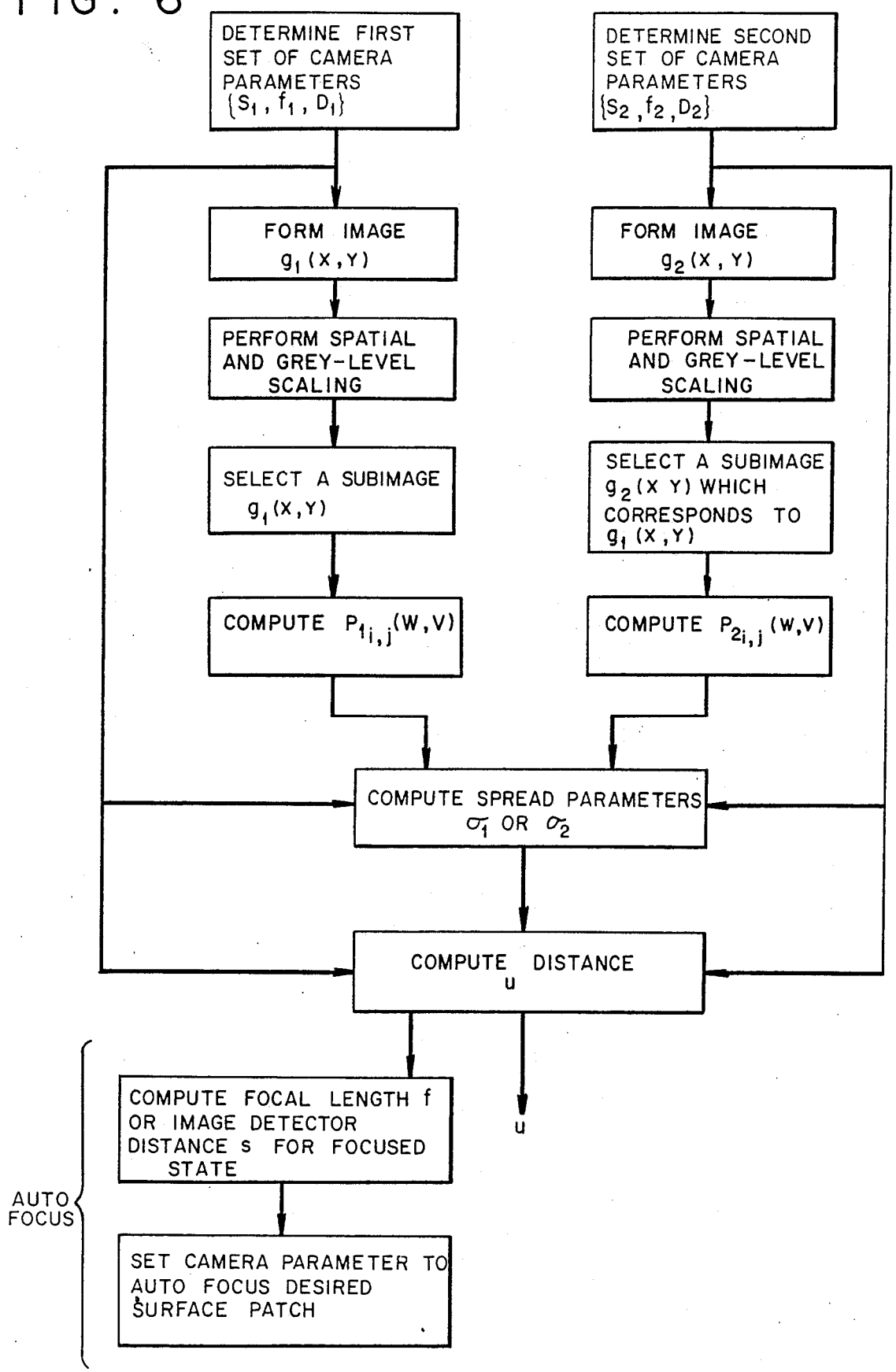
FIG. 6 is a flow chart showing the steps performed in determining the distance between a camera system and a surface patch in the 3-D scene and in automatically focusing the camera system in accordance with the method of the present invention.

Referring now to FIG. 6, the steps of the method of the present invention are as described below. An image $g_1(x,y)$ is acquired with camera parameters $\{s_1, f_1, D_1\}$ and a second image $g_2(x,y)$ is acquired with camera parameters $\{s_2, f_2, D_2\}$.

In the case where the camera parameter s is changed during the image formation process (i.e. $s_1 \neq s_2$), normalization of image magnification (in the form of "spatial scaling") is required in order to ensure that the points of the first image acquired with parameter $s_1$ corresponds to the points of the second image acquired with parameter $s_2$. In other words, spatial image scaling is required since the magnification of an observed image is proportional to the distance s of the image detector plane from the second principal plane $P_2$. Therefore, spatial scaling is performed so that all images have the same magnification. In preferred embodiment, the magnification corresponding to $s=1$ is used.

Spatial scaling can be accomplished by the following procedure. If $g_{1p}(x,y)$ is the scaled image of $g_1(x,y)$ and $g_{2p}(x,y)$ is the scaled image of $g_2(x,y)$, then the following transformation can be used for spatial scaling:

$$g_{1p}\left(\frac{x}{s_1}, \frac{y}{s_1}\right) = g_1(x,y), \text{ and} \quad (33A)$$

$$g_{2p}\left(\frac{x}{s_2}, \frac{y}{s_2}\right) = g_2(x,y). \quad (33B)$$

In the case where camera parameter $s_2$ is greater than camera parameter $s_1$, then the digital acquisition device 5 will more densely sample $g_{2p}(x,y)$ than $g_{1p}(x,y)$. In this particular case, the values of $g_{2p}(x,y)$ are to be obtained at the same points where $g_{1p}(x,y)$ has been sampled, by using an interpolation method known in the art. The newly sampled image of $g_{2p}(x,y)$ can be denoted by $g_{2ps}(x,y)$.

After the above described preprocessing operations have been performed where necessary, first and second subimages $g_{1A}(x,y)$ and $g_{2A}(x,y)$ which correspond to the image of the same surface patch "A" in the 3-D scene, are selected from the first and second two dimensional images $g_{1p}(x,y)$ and $g_{2p}(x,y)$, respectively. These subimages $g_{1A}(x,y)$ and $g_{2A}(x,y)$ correspond to the surface patch "A" of the scene, the distance u from which to the camera system is to be determined.

To mitigate any undesirable effects of the "overlap effect" described hereinbefore, (i.e. to reduce the effects of image blur spreading across the border of the subimages) each subimage can be multiplied by a suitable "centerweighted" mask. For example, a Gaussian mask whose spread is 0.2 to 0.5 times the "diameter" of the subimages can be used.

At this stage of the method, the subimages $g_{1A}(x,y)$ and $g_{2A}(x,y)$ are normalized with respect to variations in image intensity, by an operation, hereinafter referred to as "grey level scaling". Grey level scaling can be performed by multiplying the grey values of $g_{2A}(x,y)$ by a constant given by the ratio of the mean grey value of $g_{1A}(x,y)$ to the mean value of $g_{2A}(x,y)$.

The power spectral density functions $P_1(w,v)$ and $P_2(w,v)$ of $g_{1A}(x,y)$ and $g_{2A}(x,y)$ are computed, where w,v are the spatial frequency parameters expressed in radians per unit distance.

Now, the quantity C as in equation (19) is computed.

The spread parameter $\sigma_2$ can be obtained from equation (25). On the basis of the spread parameter $\sigma_2$ determined above, the distance u between the camera system and the surface patch can be determined using the equation (26B) restated below:

$$u = \frac{A_1}{A_2 \sigma_{2k} + A_3} \quad (26B)$$

where $A_1 = k_2 D_2 s_2 f_2$, $A_2 = s_2 f_2$ and $A_3 = k_2 D_2 (f_2 - s_2)$.

At this juncture, it is noted that there are modifications in the above method when desiring to determine the distance u, using small (i.e., infinitesimal) changes in the values of the camera parameters. These modifications are:

(1) The quantity C is computed using equation (31) instead of equation (19);
(2) The spread parameter $\sigma$ is determined using equation (32) instead of equation (25); and
(3) The distance u can then be determined using equation (33) instead of equation (26B).

At this juncture it is appropriate to described another aspect of the present invention which embraces a method of automatically focusing a camera system using the hereinabove described method for determining the distance between the camera system and the surface patch of a 3-D scene, which is to be brought automatically into focus.

Referring to FIG. 6, after determining the distance u between the surface patch and the camera system in accordance with one of the above described methods, the following lens system formula $$\frac{1}{f} = \frac{1}{u} + \frac{1}{s} \quad (34)$$

can be used to determine the effective focal length f of the lens system or the position s of the image detector plane which will bring the subimage region corresponding to the surface patch into focus.

Yet another aspect of the present invention concerns a method for simultaneously determining in parallel operations, the distance of a plurality of surface patches of a three-dimensional spatial scene, as measured from a camera system. For the images $g_1(x,y)$ and $g_2(x,y)$ formed with different sets of camera parameters, the subimages corresponding to a plurality of surface patches can be represented by $g_{1i,j}(x,y)$ and $g_{2i,j}(x,y)$, for $1 \leq i \leq m$ and $1 \leq j \leq n$ where each (i,j) pair specifies a unique surface patch in the scene. Corresponding to subimages $g_{1i,j}(x,y)$ and $g_{2i,j}(x,y)$, the following notation is used:

(i) Fourier transforms: $G_{1i,j}(w,v)$, $G_{2i,j}(w,v)$;
(ii) The focused subimage of the (i,j)th surface patch: $f_{i,j}(x,y)$;
(iii) The Fourier transform of the focused subimage: $F_{i,j}(w,v)$;
(iv) Optical transfer function of the camera: $H_{1i,j}(w,v)$, $H_{2i,j}(w,v)$;
(v) Power spectral density functions: $P_{1i,j}(w,v)$, $P_{2i,j}(x,y)$;
(vi) Spread parameters: $\sigma_{1i,j}$, $\sigma_{2i,j}$;
(vii) Distances from the camera: $u_{i,j}$ (also known collectively as "depth-map").

Figure 7A:
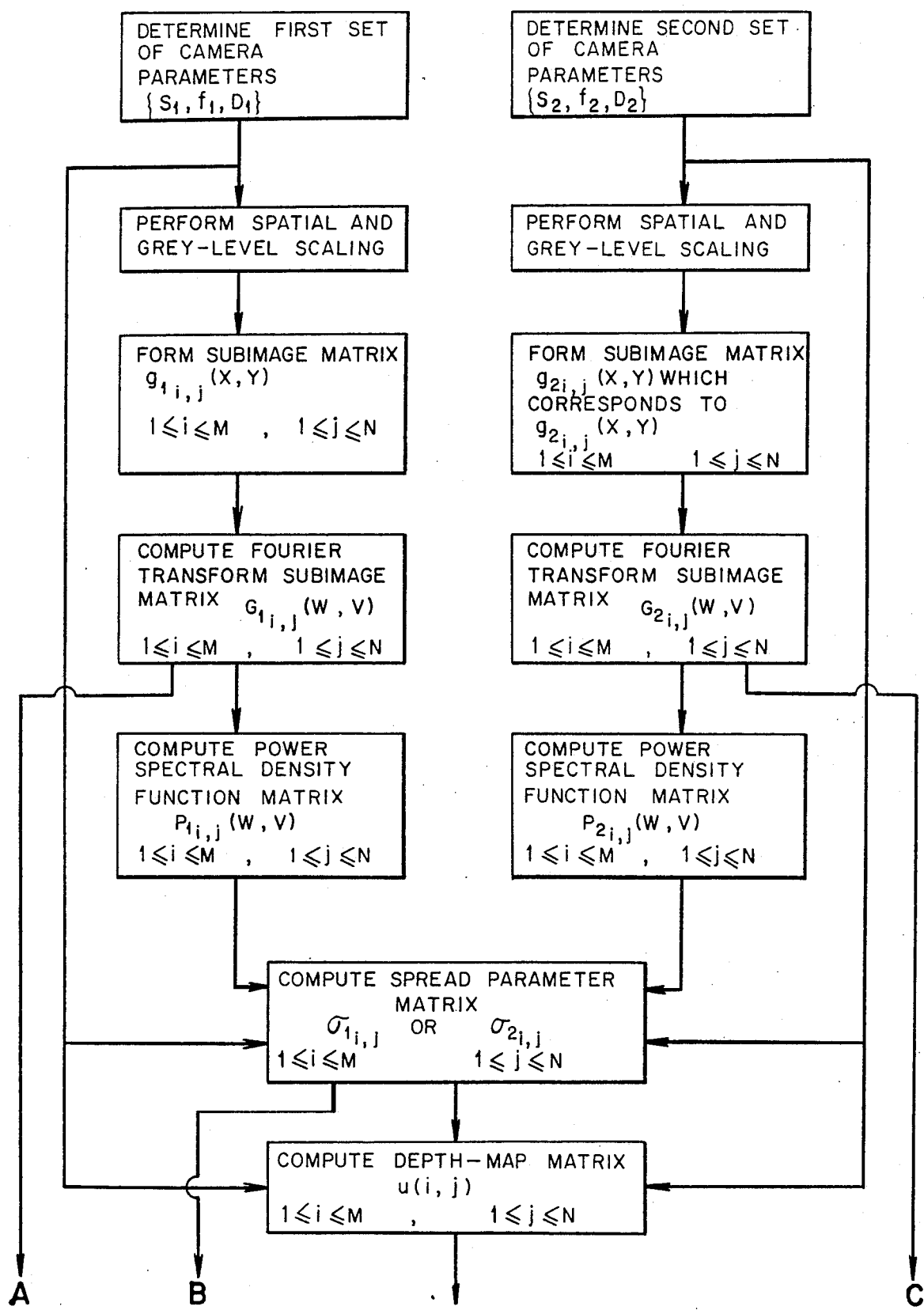
FIGS. 7A and 7B taken together comprise a flow chart showing the steps performed in recovering the depth-map of a given 3-D scene, and in generating improved-focus images from a pair of images thereof.
Figure 7B:
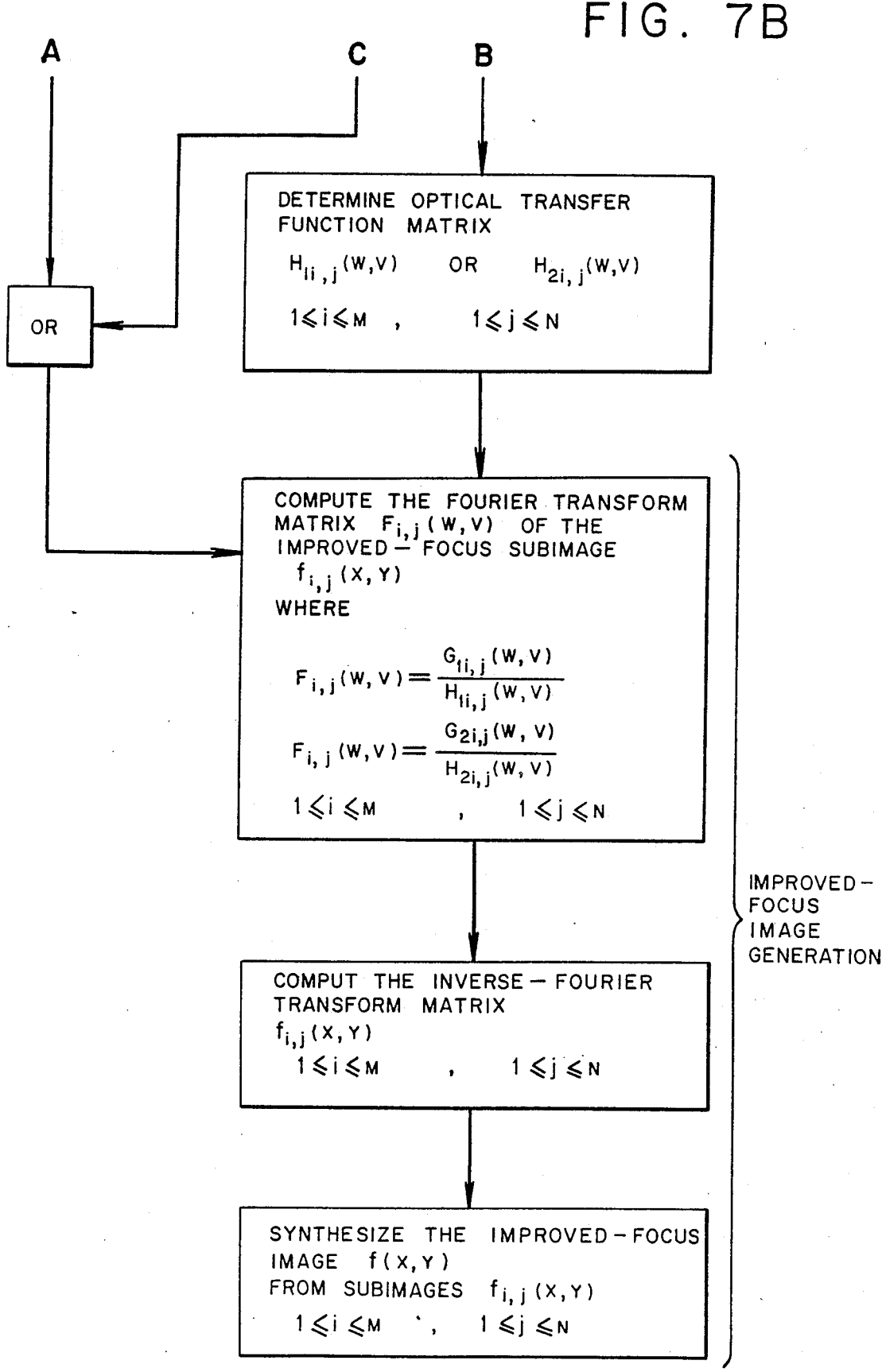

Referring to FIGS. 7A and 7B, the steps of the method of the depth map recovery will now be described below.

Using two dissimilar sets of camera parameters, $\{s_1, f_1, D_1\}$ and $\{s_2, f_2, D_2\}$, images $g_1(x,y)$ and $g_2(x,y)$, respectively, are acquired. On each image $g_1(x,y)$ and $g_2(x,y)$, grey level and spatial scaling operations are performed as hereinbefore described. Each image $g_1(x,y)$ and $g_2(x,y)$ is subdivided into a set of corresponding subimages $g_{1i,j}(x,y)$ and $g_{2i,j}(x,y)$, respectively. The Fourier transforms $G_{1i,j}(w,v)$ and $G_{2i,j}(w,v)$ and then the power spectral density functions $P_{1i,j}(w,v)$ and $P_{2i,j}(w,v)$ of the subimages are computed. On the basis of $P_{1i,j}(w,v)$ and $P_{2i,j}(w,v)$ and camera parameter sets $\{s_1, f_1, D_1\}$ and $\{s_2, f_2, D_2\}$, the spread parameters $\sigma_{1i,j}$ (or $\sigma_{2i,j}$) are computed as described hereinbefore.

On the basis of spread parameters $\sigma_{1i,j}$ (or $\sigma_{2i,j}$) and the camera parameter sets $\{s_1, f_1, D_1\}$ and $\{s_2, f_2, D_2\}$, the surface patch distances $u_{i,j}$ can be obtained by one of the distance finding methods described hereinbefore.

By this method of two-dimensional image processing, a depth-map recovery of the three-dimensional spatial scene is provided in real-time and in a computationally efficient manner.

At this juncture, it will now be appropriate to describe the method of generating an improved-focus image from a pair of first and second images formed in accordance with the principles of the present invention. Again referring to FIG. 7, the depth-map $u_{i,j}$ is obtained as described hereinabove. The optical transfer function $H_{1i,j}(w,v)$ (or $H_{2i,j}(w,v)$) corresponding to $g_{1i,j}(x,y)$ or $g_{2i,j}(x,y)$ are determined on the basis of the spread parameters $\sigma 1i,j$ (or $\sigma_{2i,j}$).

The two-dimensional Fourier transform $F_{i,j}(w,v)$ for each improved-focus subimage can be obtained as $$F_{i,j}(w,v) = \frac{G_{1i,j}(w,v)}{H_{1i,j}(w,v)} = \frac{G_{2i,j}(w,v)}{H_{2i,j}(w,v)} \tag{35}$$

The improved-focus subimages $f_{i,j}(x,y)$ for each surface patch in the scene can be obtained by computing the inverse-Fourier transform of $F_{i,j}(w,v)$. Alternatively, the improved-focus subimages $f_{i,j}(x,y)$ can be computed in the spatial domain by using a deconvolution process known in the prior art, but in the preferred embodiment, it is realized by division operations in the spatial frequency domain for reasons of computational simplicity. By combining the improved-focus subimages $f_{i,j}(x,y)$, the improved-focus image $f(x,y)$ of the scene is obtained.

It would be within the scope and spirit of the present invention to determine the distance u of a surface patch in a 3-D scene to a camera system, using more than a pair of two-dimensional images acquired according to the principles of the present invention. Thus, if n two-dimensional images are acquired using different sets of camera parameter values, then n-1 independent estimates of the distance u can be performed and the mean value of these distances can provide a robust estimate of the distance u. Independent estimates of distance u are obtained by applying the distance determining method of the present invention to pairs of images, such that each pair contains at least one image which is not contained in any other pair. It is expected that the performance of all the aforedescribed methods can be improved by using more than just two images.

In addition, the methods described hereinabove are based on a Fourier domain analysis of the acquired images and subimages. However, it is possible to do a corresponding analysis in other domains (e.g. spatial domain, Z-transform domain, etc.). The Fourier domain has been chosen for its simplicity and, in particular, power spectrum analysis has been chosen as it has a physical interpretation in signal processing.

In the preferred embodiment of the distance finding and depth-map recovery methods, a camera system characterized by a Gaussian point spread function was used. However, it would be within the scope of the present invention to modify the methods to include camera systems characterizable by an arbitrary point spread function. In such cases, the expression derivable for the spread parameters will be different. Described hereinbelow is one approach to modeling a camera system characterized by an arbitrary point spread function, and determining distances to surface patches in a 3-D scene.

A first constraint (i.e., binding relation or mathematical expression) between $\sigma_1$ and $\sigma_2$ in terms of the observed images $g_1(x,y)$ and $g_2(x,y)$ can be obtained as described below.

The optical transfer functions for the observed images $g_1(x,y)$ and $g_2(x,y)$ can be denoted by $H_{\sigma 1}(w,v)$ and $H_{\sigma 2}(w,v)$, respectively. Using equation (13), the power spectral density functions can be expressed as $$P_1(w,v) = H_{\sigma 1}(w,v) \, H_{\sigma 1}^*(w,v) \, F(w,v) \, F^*(w,v) \tag{36A}$$

and $$P_2(w,v) = H_{\sigma 2}(w,v) \, H_{\sigma 2}^*(w,v) \, F(w,v) \, F^*(w,v). \tag{36B}$$

By dividing equation (36A) by equation (36B) the following constraint is obtained:

$$\frac{P_1(w,v)}{P_2(w,v)} = \frac{H_{\sigma 1}(w,v) \, H^*_{\sigma 1}(w,v)}{H_{\sigma 2}(w,v) \, H^*_{\sigma 2}(w,v)} \tag{37}$$

Significantly, this expression defines a first constraint between the spread parameters $\sigma_1$ and $\sigma_2$ in terms of the power spectral density functions of the observed images $g_1(x,y)$ and $g_2(x,y)$. This expression is analogous to the first constraint defined in equation (17) for the case where the point spread function is of Gaussian form.

For an arbitrary point spread function $h(x,y)$, the spread parameter can be defined as the square root of the second central moment of the distribution $h(x,y)$, i.e.

$$\sigma = \left[ \int_{-\infty}^{\infty} \int_{-\infty}^{\infty} [(x - \bar{x})^2 + (y - \bar{y})^2] h(x,y) dx dy \right]^{-\frac{1}{2}} \tag{38}$$

where $(\bar{x}, \bar{y})$ is the center of mass of the distribution given by $$\bar{x} = \int_{-\infty}^{\infty} \int_{-\infty}^{\infty} x h(x,y) dx dy \tag{39A}$$

and $$\bar{y} = \int_{-\infty}^{\infty} \int_{-\infty}^{\infty} y h(x,y) dx dy \tag{39B}$$

The spread parameter $\sigma$ can be related to the diameter d of the blur circle by a function t as $$d = t(\sigma) \tag{40}$$

where t is determined by camera calibration. Substituting for d in terms of the camera parameters from equation (4) in equation (40), the following equation is obtained:

$$D\left[\frac{1}{f} - \frac{1}{u} - \frac{1}{s}\right] = t(\sigma) \tag{41}$$

Rearranging terms in the above equation (41), the following expression is obtained:

$$u = \left[\frac{1}{f} - \frac{1}{s} - \frac{t(\sigma)}{D}\right]^{-1} \tag{43}$$

Now for two different sets of camera parameters $\{s_1, f_1, D_1\}$ and $\{s_2, f_2, D_2\}$, the following expressions can be derived:

$$u = \left[\frac{1}{f_1} - \frac{1}{s_1} - \frac{t(\sigma_1)}{D_1}\right]^{-1} \tag{44A}$$

$$u = \left[\frac{1}{f_2} - \frac{1}{s_2} - \frac{t(\sigma_2)}{D_2}\right]^{-1} \tag{44B}$$

Eliminating the term u from the above equations (44A) and (44B) and simplifying, the following equation is obtained:

$$t(\sigma_1) = \alpha' t(\sigma_2) + \beta' \tag{45}$$

where $$\alpha' = \frac{D_1}{D_2} \tag{46A}$$

and $$\beta' = D_1\left[\frac{1}{f_1} - \frac{1}{f_2} + \frac{1}{s_2} - \frac{1}{s_1}\right] \tag{46B}$$

Equation (45) is a second constraint between the two spread parameters $\sigma_1$ and $\sigma_2$. This second constraint is analogous to the second constraint defined in equation (22) for the case where the point spread function is of Gaussian form.

As with equations (20) and (22) for the case of a Gaussian point spread function, the equations (37) and (45) constitute two fundamental equations in the unknowns $\sigma_1$ and $\sigma_2$. Solving these equations (37) and (45) simultaneously, the spread parameters $\sigma_1$ and $\sigma_2$ can be obtained. Thereafter, the distance u of a surface patch from the camera system is computed using either equation (26A) or equation (26B).

Further modifications of the present invention herein disclosed will occur to persons skilled in the art to which the present invention pertains, and all such modifications are deemed to be within the scope and spirit of the present invention defined by the appended claims.

What is claimed is:

1. A method of determining the distance between a surface patch in a three-dimensional spatial scene and a camera system which includes an image forming system, said camera system characterizable by a point spread function having a spread parameter and by three camera parameters, one or more of which can be set to a different camera parameter value during the image formation process and all of which are quantifiably determinable to provide a first and second set of camera parameters which have at least one dissimilar camera parameter value, said method comprising:
   (a) forming a first two-dimensional image of said three-dimensional spatial scene using said camera system characterized by a first set of camera parameters and a first spread parameter of said point spread function;
   (b) forming a second two-dimensional image of said three-dimensional spatial scene using said camera system characterized by a second set of camera parameters and a second spread parameter of said point function, said first and second set of camera parameters having at least one dissimilar camera parameter value;
   (c) selecting from said first and second two-dimensional images, a first and a second subimage, respectively, which correspond to the surface patch of said three-dimensional spatial scene, the distance from which to said camera system is to be determined;
   (d) on the basis of said first and second subimages, deriving a first constraint between said spread parameters;
   (e) deriving a second constraint between said spread parameters on the basis of the values of said first and second set of camera parameters;
   (f) determining said spread parameters using said first and second constraints derived in steps (d) and (e), respectively; and
   (g) on the basis of at least one of said spread parameters determined in step (f) and said first and second set of camera parameters, determining the distance between said camera system and the surface patch in said three-dimensional spatial scene.

2. The method of claim 1, wherein step (d) includes:
computing first and second power spectral density functions corresponding to said first and second subimages, respectively;
formulating a ratio expression using said first and second power spectral density functions, and
on the basis of said ratio expression, formulating said first constraint between said spread parameters.

3. The method of claim 1, wherein said image forming system forms a blur circle having a diameter and corresponding to every point on said surface patch in said three-dimensional spatial scene, and wherein step (e) includes
formulating a relationship between said spread parameters and the diameter of said blur circle corresponding to said surface patch in said three-dimensional spatial scene, and
using said relationship to derive said second constraint between said spread parameters.

4. The method of claim 1, wherein said point spread function is of Gaussian form.

5. A method of, determining the distance between a surface patch in a three-dimensional spatial scene and a camera system which includes an image forming system, said camera system characterizable by a point spread function having a spread parameter and by three camera parameters, one or more of which can be set to a different camera parameter value during the image formation process and all of which are quantifiably determinable to provide a first and second set of camera parameters which have at least one dissimilar camera parameter value, wherein said camera system is disposed at a distance from said surface patch in said three-dimensional spatial scene, and includes a camera aperture and an image detector plane, wherein said image forming system is characterizable by first and second principal planes and a focal length, said second principal plane being closer to said image detector plane than said first principal plane, and wherein said three camera parameters are (i) the distance between said second principal plane and said image detector plane,
(ii) the diameter of said camera aperture, and
(iii) said focal length of said image forming system, said method comprising:
  (a) forming a first two-dimensional image of said three-dimensional spatial scene using said camera system characterized by a first set of camera parameters and a first spread parameter of said point spread function;
  (b) forming a second two-dimensional image of said three-dimensional spatial scene using said camera system characterized by a second set of camera parameters and a second spread parameter of said point spread function, said first and second set of camera parameters having at least one dissimilar camera parameter value;
  (c) selecting from said first and second two-dimensional images, a first and a second subimage, respectively, which correspond to the surface patch of said three-dimensional spatial scene, the distance from which to said camera system is to be determined;
  (d) on the basis of said first and second subimages, deriving a first constraint between said spread parameters;
  (e) deriving a second constraint between said spread parameters on the basis of the values of said first and second set of camera parameters;
  (f) determining said spread parameters using said first and second constraints derived in steps (d) and (e), respectively; and
  (g) on the basis of at least one of said spread parameters determined in step (f) and said first and second set of camera parameters, determining the distance between said camera system and the surface patch in said three-dimensional spatial scene.

6. The method of claim 5, wherein the steps (a) and (b) comprise forming said first and second two-dimensional images of said three-dimensional spatial scene, using said camera system, said three camera parameters defined in claim 2 having at least one dissimilar camera parameter value.

7. The method of claim 5, wherein said image forming system comprises a lens system.

8. The method of claim 5, wherein said image forming system comprises an image forming mirror system.

9. The method of claim 5, wherein said distance determined between said camera system and the surface patch in said three-dimensional spatial scene is used for automatically focusing said camera system by a method which comprises:

(a) determining said distance between said camera system and said surface patch in said three-dimensional spatial scene;
  (b) on the basis of said distance determined in step (a), using an image forming system formula derived from camera configuration and characteristics of said camera system to determine one of the following camera parameters, (i) said focal length of said image forming system and (ii) the distance between said second principle plane and said image detector plane, which brings said surface patch into focus; and
  (c) setting the camera parameter determined in step (b) to the value thereof determined using said image forming system formula.

10. The method of claim 9, wherein step (b) comprises
  determining one of said focal length of said image forming system and the distance between the second principal plane and the image detector plane, using said image forming system formula expressed in terms of said focal length of said image forming system, the distance between said camera system and said surface patch in said three-dimensional spatial scene, and the distance between said image detector plane and said second principal plane for a focused two-dimensional subimage.

11. A method of determining the distances of a plurality of surface patches in a three-dimensional spatial scene, measured from a camera system which includes an image forming system, said camera system being characterizable by a point spread function having a spread parameter and by three camera parameters, one or more of which can be set to a different camera parameter value during the image formation process and all of which are quantifiably determinable to provide a first and second set of camera parameters which have at least one dissimilar camera parameter value, said method comprising:
  (a) forming a first two-dimensional image of said three-dimensional spatial scene using said camera system characterizable by a first set of camera parameters and a first spread parameter of said point spread function;
  (b) forming a second two-dimensional image of said three-dimensional spatial scene using said camera system characterizable by a second set of camera parameters and a second spread parameter of said point spread function, said first and second set of camera parameters having at least one dissimilar camera parameter value;
  (c) dividing said first and second two-dimensional images into a plurality of two-dimensional subimages, each two-dimensional subimage in said first two-dimensional image corresponding to one two-dimensional subimage in said second two-dimensional image, and each corresponding two-dimensional subimage of said first and second two-dimensional images corresponding to one of said surface patches of said three-dimensional spatial scene;
  (d) on the basis of each first and second corresponding subimage, deriving a first constraint between the spread parameters of said point spread function corresponding to each first and second corresponding subimages;
  (e) for each first and second corresponding subimage, deriving a second constraint between said spread parameters on the basis of the values of said first and second set of camera parameters;

(f) determining for each first and second corresponding subimage, said spread parameters, using said first and second constraints derived in steps (d) and (e) respectively; and (g) on the basis of at least one of said spread parameters determined in step (f), determining the distance between said camera system and each surface patch in said three-dimensional spatial scene, whereby a depth-map of said three-dimensional spatial scene is obtained.

12. The method of claim 11, wherein step (d) includes:

computing first and second power spectral density functions corresponding to each first and second corresponding subimage, respectively;

formulating a ratio expression corresponding to each first and second corresponding subimage, using said first and second power spectral density functions corresponding to each first and second corresponding subimages; and on the basis of said ratio expression for each first and second subimage, formulating said first constraint between said spread parameters for each first and second corresponding subimage.

13. The method of claim 11, wherein said image forming system forms a blur circle having a diameter corresponding to every point on said plurality of surface patches in said three-dimensional spatial scene, and wherein step (e) includes formulating a relationship between said spread parameters of said camera system and said diameter of said blur circle, and using said relationship to derive said second constraint between said spread parameters for each first and second corresponding subimage.

14. The method of claim 11, wherein said point spread function is of Gaussian form.

15. The method of claim 11, wherein the spread parameters corresponding to each first and second corresponding subimages are used in generating an improved-focus two-dimensional image from said first or second two-dimensional images, by a method which comprises:

on the basis of said spread parameters determined in step (f) which correspond to each first and second corresponding subimages, for at least one of said first and second images, determining the optical transfer function of said camera system corresponding to each first and second corresponding subimage;

computing the two-dimensional Fourier transform of each first and second corresponding subimage;

on the basis of the transfer function of said camera system for each corresponding first and second subimage, and the corresponding two-dimensional Fourier transform of each first and second subimage, computing the two-dimensional Fourier transform for each improved-focus first and second corresponding subimage by dividing each said two-dimensional Fourier transform by the corresponding optical transfer function of said camera system;

computing the inverse Fourier transform for each two-dimensional Fourier transform determined in the above step to provide the improved-focus two-dimensional subimage corresponding thereto; and synthesizing each improved-focus two-dimensional subimage to form said improved-focus two-dimensional image.

16. A method of, determining the distances of a plurality of surface patches in a three-dimensional spatial scene, measured from a camera system which includes an image forming system, said camera system being characterizable by a point spread function having a spread parameter and by three camera parameters, one or more of which can be set to a different camera parameter value during the image formation process and all of which are quantifiably determinable to provide a first and second set of camera parameters which have at least one dissimilar camera parameter value, wherein said camera system includes a camera aperture and an image detector plane, wherein said image forming system is characterizable by a first and a second principal plane and a focal length, said second principal plane being closer to said image detector plane than said first principal plane, and wherein said three camera parameters are (i) the distance between said second principal plane and said image detector plane, (ii) the diameter of said camera aperture, and (iii) said focal length of said image forming system, said method comprising:

(a) forming a first two-dimensional image of said three-dimensional spatial scene using said camera system characterized by a first set of camera parameters and a first spread parameter of said point spread function;

(b) forming a second two-dimensional image of said three-dimensional spatial scene using said camera system characterized by a second set of camera parameters and a second spread parameter of said point spread function, said first and second set of camera parameters having at least one dissimilar camera parameter value;

(c) dividing said first and second two-dimensional images into a plurality of two-dimensional subimages, each two-dimensional subimage in said first two-dimensional image corresponding to one two-dimensional subimage in said second two-dimensional image, and each corresponding two-dimensional subimage of said first and second two-dimensional images corresponding to one of said surface patches of said three-dimensional spatial scene;

(d) on the basis of each first and second corresponding subimage, deriving a first constraint between the spread parameters of said point spread functions corresponding to each first and second corresponding subimages;

(e) for each first and second corresponding subimage, deriving a second constraint between said spread parameters on the basis of the values of said first and second set of camera parameters;

(f) determining for each first and second corresponding subimage, said spread parameters, using said first and second constraints derived in steps (d) and (e) respectively; and (g) on the basis of at least one of said spread parameters determined in step (f), determining the distance between said camera system and each surface patch in said three-dimensional spatial scene, whereby a depth-map of said three-dimensional spatial scene is obtained.

17. The method of claim 16, wherein the steps (a) and (b) comprise forming said first and second two-dimensional images of said three-dimensional spatial scene, using said camera system, said three camera parameters defined in claim 12 having at least one dissimilar camera parameter value.

18. The method of claim 16, wherein said image forming system comprises a lens system.

19. The method of claim 16, wherein said image forming system comprises an image forming mirror.

20. Apparatus for determining the distances between one or more surface patches in a three-dimensional spatial scene and a camera system located therefrom, said apparatus comprising:
(a) a camera system including an image detector plane, a camera aperture, and an image forming system characterizable by first and second principal planes and a focal length, said second principal plane being closer to said image detector plane than said first principal plane, said camera system having at least three camera parameters including,
  (i) the distance between said second principal plane and image detector plane,
  (ii) the diameter of said camera aperture, and
  (iii) said focal length of said image forming system;
(b) camera parameter value varying means for varying the value of at least one of said camera parameters for forming two-dimensional images of said surface patches on said image detector plane using a set of camera parameter values;
(c) means for quantitatively measuring the value of each of said camera parameters including the changes in said camera parameter values effected by said camera parameter value varying means;
(d) means for acquiring two-dimensional images from said image detector and generating digital image data corresponding to each acquired two-dimensional image; and
(e) an image processing computer for receiving said digital image data corresponding to each acquired two-dimensional image and processing said digital image data to determine the distance between said surface patch and said camera system.

21. The apparatus of claim 20, which further comprises visual display means for visually displaying the values of said camera parameters and the changes effected in said camera parameters.

22. The apparatus of claim 20, wherein said image forming system comprises a lens system.

23. The apparatus of claim 20, wherein said image forming system comprises an image forming mirror system.

24. The apparatus of claim 20, wherein said image detector plane comprises a charge coupled device array.

25. The apparatus of claim 20, wherein said image detector plane comprises photographic film.

26. The apparatus of claim 21, wherein said visual display means comprises a cathode ray tube device.

* * * * *